US010719982B2

(12) United States Patent
Lin et al.

(10) Patent No.: US 10,719,982 B2
(45) Date of Patent: Jul. 21, 2020

(54) SURFACE EXTRCTION METHOD, APPARATUS, AND NON-TRANSITORY COMPUTER READABLE STORAGE MEDIUM THEREOF

(71) Applicant: HTC Corporation, Taoyuan (TW)

(72) Inventors: Yi-Chen Lin, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/231,944

(22) Filed: Dec. 25, 2018

(65) Prior Publication Data
US 2019/0197767 A1 Jun. 27, 2019

Related U.S. Application Data

(60) Provisional application No. 62/610,505, filed on Dec. 26, 2017.

(51) Int. Cl.
G06T 17/00 (2006.01)
(52) U.S. Cl.
CPC ........ G06T 17/005 (2013.01); G06T 2210/61 (2013.01)
(58) Field of Classification Search
CPC .......................... G06T 17/005; G06T 2210/06
See application file for complete search history.

(56) References Cited

U.S. PATENT DOCUMENTS 6,738,062 B1 * 5/2004 Moreton ................. G06T 17/20
345/420

2003/0214502 A1 11/2003 Park et al.
2008/0238919 A1 10/2008 Pack
2018/0190013 A1 * 7/2018 Wald .................... G06T 17/005

FOREIGN PATENT DOCUMENTS

| CN | 100561523 C | 11/2009 |
|---|---|---|
| CN | 102129709 A | 7/2011 |
| CN | 102722885 A | 10/2012 |
| CN | 103021017 A | 4/2013 |

(Continued)

OTHER PUBLICATIONS

Frisken, Sarah F., et al. "Adaptively sampled distance fields: A general representation of shape for computer graphics." Proceedings of the 27th annual conference on Computer graphics and interactive techniques. ACM Press/Addison-Wesley Publishing Co., 2000. (Year: 2000).*

(Continued)

*Primary Examiner* — Diane M Wills
(74) *Attorney, Agent, or Firm* — CKC & Partners Co., LLC

(57) ABSTRACT

A surface extraction method that includes the steps outlined below is provided. (A) Raw input depth data of 3D child nodes are received that includes positions and distances of first 3D child nodes and positions of second 3D child nodes. (B) The neighboring 3D child nodes are grouped into 3D parent nodes. (C) For each 3D parent nodes, propagated distances of the second 3D child nodes are generated. (D) The 3D parent nodes are treated as the 3D child nodes to perform the steps (B)-(D) to generate a tree including a plurality levels of nodes such that a surface extraction processing is performed on the tree to extract at least one surface of the scene.

11 Claims, 7 Drawing Sheets

(56) References Cited

FOREIGN PATENT DOCUMENTS

| | | |
|---|---|---|
| TW | 201015490 A | 4/2010 |
| TW | 201025186 A | 7/2010 |
| TW | 201414286 A | 4/2014 |
| TW | 201621815 A | 6/2016 |

OTHER PUBLICATIONS

Ohtake, Yutaka, et al. "Multi-level partition of unity implicits." ACM Siggraph 2005 Courses. 2005. 173-es. (Year: 2005).*
Schaefer, Scott, and Joe Warren. "Dual marching cubes: Primal contouring of dual grids." 12th Pacific Conference on Computer Graphics and Applications, 2004. p. 2004. Proceedings . . . IEEE, 2004. (Year: 2004).*
Yin, Kangxue, Youquan Liu, and Enhua Wu. "Fast computing adaptively sampled distance field on GPU." (2011). (Year: 2011).*
Corresponding Taiwan office action dated Jul. 25, 2019.

* cited by examiner

SURFACE EXTRCTION METHOD, APPARATUS, AND NON-TRANSITORY COMPUTER READABLE STORAGE MEDIUM THEREOF

RELATED APPLICATIONS

This application claims priority to U.S. Application Ser. No. 62/610,505, filed Dec. 26, 2017, which is herein incorporated by reference.

BACKGROUND

Field of Invention

The present invention relates to a surface extraction technology. More particularly, the present invention relates to a surface extraction method, a surface extraction apparatus and a non-transitory computer readable storage medium thereof.

Description of Related Art

Nowadays, computer vision methods are widely used in various applications. For example, in virtual reality (VR) or augmented reality (AR) application, computer vision methods are used for the VR/AR system to identify objects, real-world environment and/or scenes.

3D reconstruction is particularly popular in the field of AR. When depth information of the environment is obtained, the depth value can be used to extract the iso-surface, e.g. the outline of the 3D geometry during the reconstruction process. However, lots of depth data is required to perform the surface extraction process and results in large memory usage.

Accordingly, what is needed is a surface extraction method, a surface extraction apparatus and a non-transitory computer readable storage medium thereof to address the issues mentioned above.

SUMMARY

An aspect of the present invention is to provide a surface extraction method that includes the steps outlined below. (A) Raw input depth data of a plurality of 3D child nodes of a scene are received, wherein the raw input depth data comprises positions and distances of a plurality of first 3D child nodes of the 3D child nodes and the positions but without the distances of a plurality of second 3D child nodes of the 3D child nodes, and each of the distances is a distance value from the first 3D child nodes to an object surface of an object in the scene. (B) The neighboring 3D child nodes are grouped into a plurality of 3D parent nodes, wherein each of the 3D parent nodes comprises the same number of the 3D child points. (C) For each of the 3D parent nodes, propagated distances of the second 3D child nodes are generated within the 3D parent nodes according to the distances of the first 3D child nodes within the same 3D parent nodes. (D) The 3D parent nodes are treated as the 3D child nodes to perform the steps (B)-(D) until the number of the 3D parent nodes is a predetermined number that become a root to generate a tree comprising a plurality levels of nodes such that a surface extraction processing is performed on the tree to extract at least one surface of the scene.

Another aspect of the present invention is to provide a surface extraction apparatus that includes a processing circuit and a memory. The memory is electrically connected to the processing circuit and is configured to store at least one program configured to be executed by the processing circuit, the at least one program comprising instructions for performing a surface extraction method that includes the steps outlined below. (A) Raw input depth data of a plurality of 3D child nodes of a scene are received, wherein the raw input depth data comprises positions and distances of a plurality of first 3D child nodes of the 3D child nodes and the positions but without the distances of a plurality of second 3D child nodes of the 3D child nodes, and each of the distances is a distance value from the first 3D child nodes to an object surface of an object in the scene. (B) The neighboring 3D child nodes are grouped into a plurality of 3D parent nodes, wherein each of the 3D parent nodes comprises the same number of the 3D child points. (C) For each of the 3D parent nodes, propagated distances of the second 3D child nodes are generated within the 3D parent nodes according to the distances of the first 3D child nodes within the same 3D parent nodes. (D) The 3D parent nodes are treated as the 3D child nodes to perform the steps (B)-(D) until the number of the 3D parent nodes is a predetermined number that become a root to generate a tree comprising a plurality levels of nodes such that a surface extraction processing is performed on the tree to extract at least one surface of the scene.

Yet another aspect of the present invention is to provide a non-transitory computer readable storage medium storing at least one program, comprising instructions, which when executed, causes a processing circuit to perform a surface extraction method that includes the steps outlined below. (A) Raw input depth data of a plurality of 3D child nodes of a scene are received, wherein the raw input depth data comprises positions and distances of a plurality of first 3D child nodes of the 3D child nodes and the positions but without the distances of a plurality of second 3D child nodes of the 3D child nodes, and each of the distances is a distance value from the first 3D child nodes to an object surface of an object in the scene. (B) The neighboring 3D child nodes are grouped into a plurality of 3D parent nodes, wherein each of the 3D parent nodes comprises the same number of the 3D child points. (C) For each of the 3D parent nodes, propagated distances of the second 3D child nodes are generated within the 3D parent nodes according to the distances of the first 3D child nodes within the same 3D parent nodes. (D) The 3D parent nodes are treated as the 3D child nodes to perform the steps (B)-(D) until the number of the 3D parent nodes is a predetermined number that become a root to generate a tree comprising a plurality levels of nodes such that a surface extraction processing is performed on the tree to extract at least one surface of the scene.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
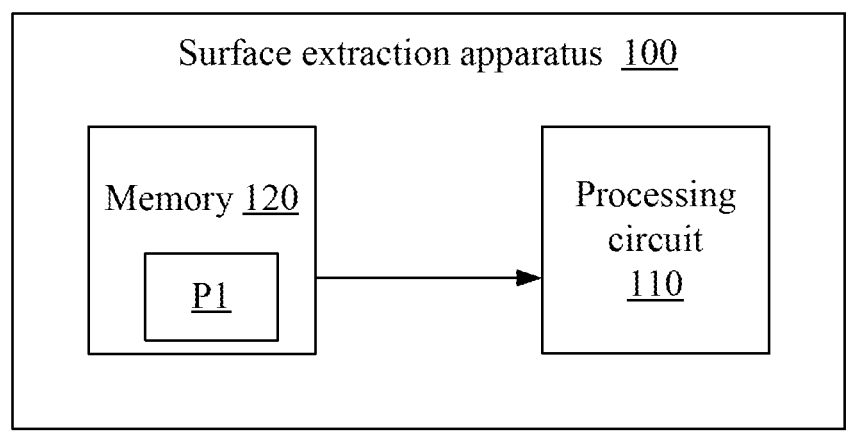
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating a surface extraction apparatus 100 in accordance with some embodiments of the present disclosure. The surface extraction apparatus 100 may be configured to perform a surface extraction, in which the surface extraction apparatus 100 may be included in a 3D model reconstruction device (not illustrated) and the surface extraction may be further used to perform 3D model reconstruction.

As shown in FIG. 1, the surface extraction apparatus 100 includes a processing circuit 110 and a memory 120. At least one program P1 are stored in the memory 120 and configured to be executed by the processing circuit 110, in order to perform the surface extraction.

In structural, the memory 120 is electrically connected to the processing circuit 110.

In some embodiments, the processing circuit 110 can be realized by, for example, one or more processors, such as central processors and/or microprocessors, but are not limited in this regard.

In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

Figure 2:
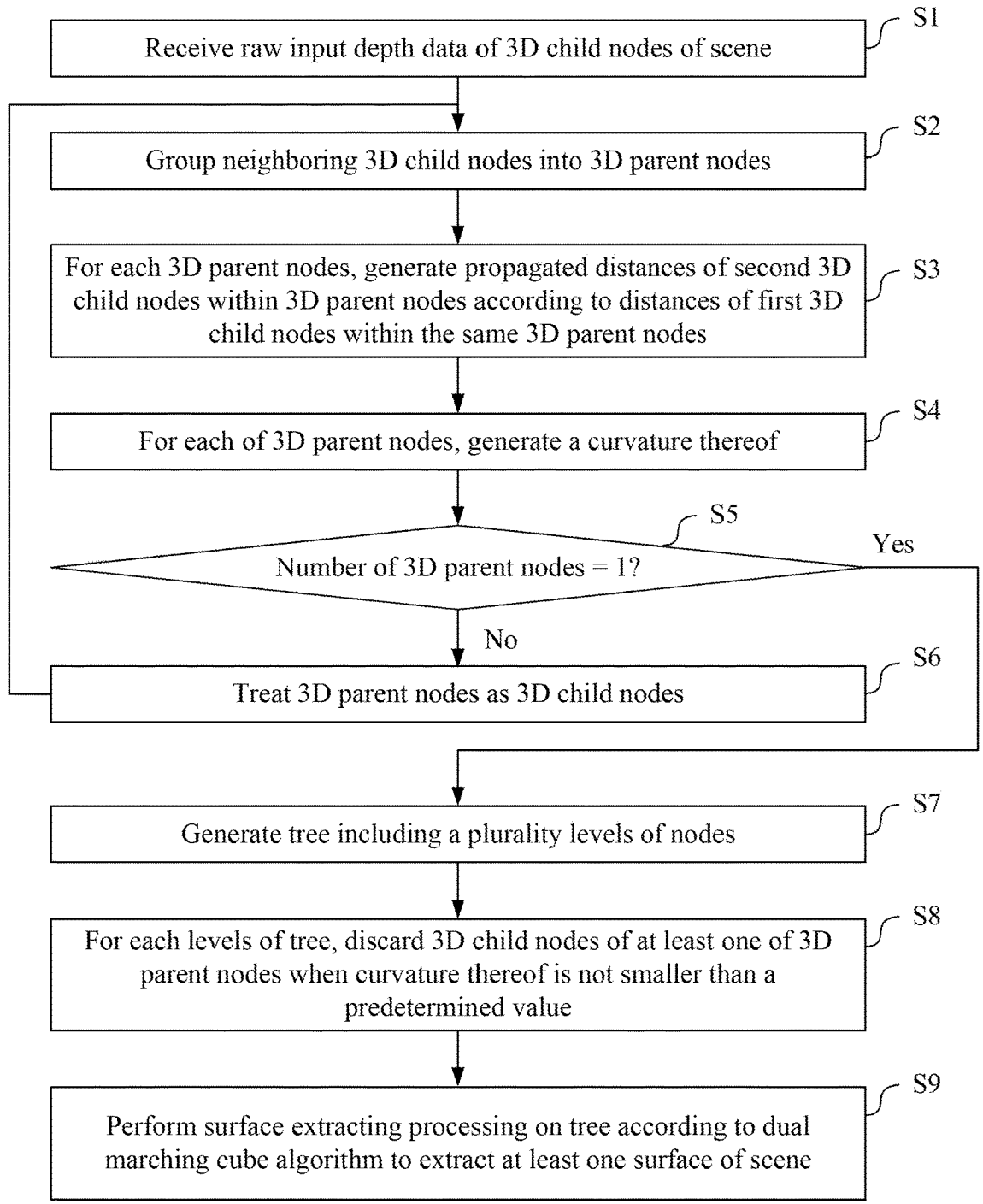
FIG. 2 is a flowchart illustrating a 3D model reconstruction method in accordance with some embodiments of the present disclosure.

For better understanding of the present disclosure, the detailed step of the surface extraction apparatus 100 will be discussed in accompanying with the embodiments shown in FIG. 2 and FIG. 3A to FIG. 3G. FIG. 2 is a flowchart illustrating a surface extraction method 200 in accordance with some embodiments of the present disclosure. FIG. 3A to FIG. 3G are diagrams illustrating different stages of processing of the surface extraction method 200 according to some embodiments of the present disclosure.

It should be noted that the surface extraction method 200 can be applied to an electrical device having a structure that is the same as or similar to the structure of the surface extraction apparatus 100 shown in FIG. 1. To simplify the description below, the embodiments shown in FIG. 1 will be used as an example to describe the surface extraction method 200 according to some embodiments of the present disclosure. However, the present disclosure is not limited to application to the embodiments shown in FIG. 1.

The surface extraction method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step S1, raw input depth data of a plurality of 3D child nodes 300 of a scene are received.

The raw input depth data can be received from such as, but not limited to a depth camera (not illustrated) that is capable of capturing image data and depth data of at least one object in a scene. In an embodiment, an object 30 is exemplarily illustrated as a region with intersected lines in FIG. 3A.

Figure 3A:
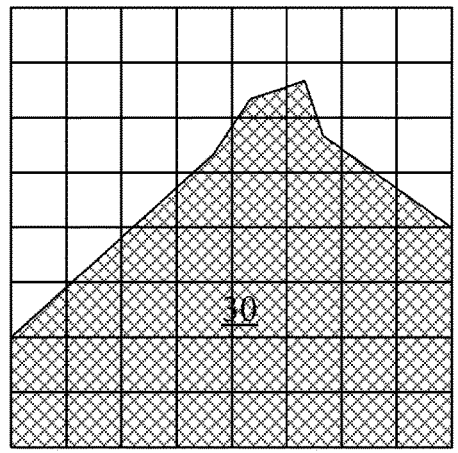
FIG. 3A to FIG. 3G are diagrams illustrating different stages of processing of the surface extraction method according to some embodiments of the present disclosure.
Figure 3B:
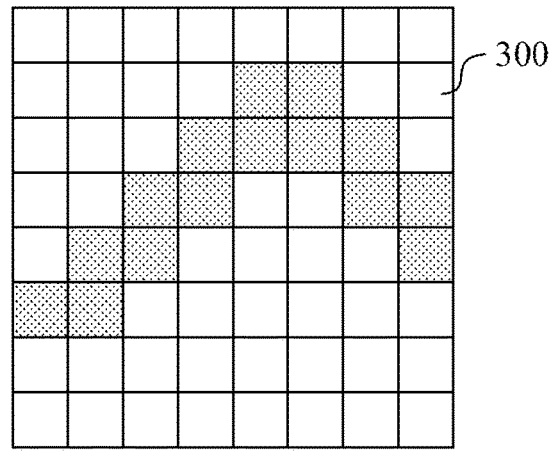

In FIG. 3B, an exemplary raw input depth data is illustrated that includes a plurality of 3D child nodes 300. In an embodiment, the raw input depth data substantially includes 8×8×8 3D child nodes 300. However, it is appreciated that in FIG. 3A, 8×8 3D child nodes 300 arranged on a 2D plane are illustrated in order to simplify the discussion.

The 3D child nodes 300 include first 3D child nodes each illustrated as a dotted block, in which in an embodiment, the first 3D child nodes are the nodes that a surface of the object 30 in FIG. 3A traverses through.

The raw input depth data includes positions and distances of the first 3D child nodes. The positions of the first 3D child nodes may include the coordinates of the first 3D child nodes in the 3D space. Each of the distances of the first 3D child nodes is the distance value from such as, but not limited to a center of each of the first 3D child nodes to the surface of the object 30. In an embodiment, when the center of the first 3D child node is within the object 30, the distance is a negative value. When the center of the first 3D child node is outside of the object 30, the distance is a positive value.

The 3D child nodes 300 further include second 3D child nodes each illustrated as a blanked block, in which in an embodiment, the second 3D child nodes are the nodes that the surface of the object 30 in FIG. 3A does not traverse through.

The raw input depth data includes positions but without the distances of the second 3D child nodes.

As a result, the raw input depth data is non-continuous since a part of the 3D child nodes 300 have the data of the distances while another part of the 3D child nodes 300 have no data of the distances.

Figure 3C:
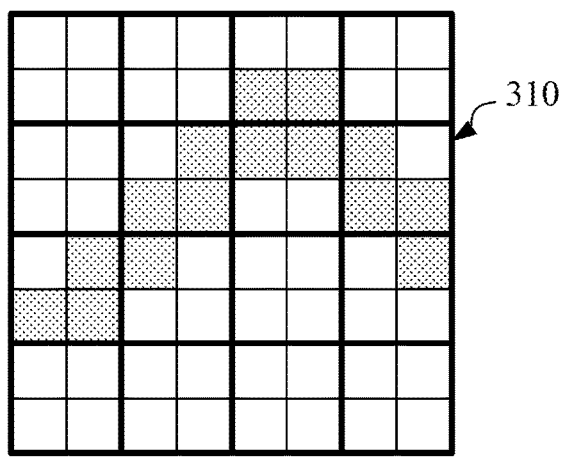

In step S2, the neighboring 3D child nodes, whether the 3D child nodes 300 are the first or the second 3D child nodes, are grouped into a plurality of 3D parent nodes, e.g. the 3D parent node 310 that includes a plurality of 3D child nodes illustrated as a block with a thick solid line, as illustrated in FIG. 3C. Each of the 3D parent nodes 310 includes the same number of the 3D child points.

In an embodiment, the 3D child nodes 300 are grouped as a cube to become the 3D parent node 310, in which in a numerical example, 2×2×2 3D child nodes are grouped as the 3D parent node 310. However, as described above, in order to simplify the discussion, only 2×2 3D child nodes on the 2D plane are illustrated as the 3D child nodes 300 included in one 3D parent node 310 in FIG. 3C.

In step S3, for each of the 3D parent nodes 310, propagated distances of the second 3D child nodes are generated within the 3D parent nodes 310 according to the distances of the first 3D child nodes within the same 3D parent nodes 310.

In different embodiments, the propagated distances of the second 3D child nodes are generated by using different methods. However, in an embodiments, for the 3D parent nodes 310 that only include the second 3D child nodes without the first 3D child node 302, the propagated distances are not generated. As a result, in FIG. 3D, after step S3 is performed, the second 3D child nodes having the propagated distances are illustrated as blocks with slash lines. The second 3D child nodes that do not have the propagated distances are still illustrated as blanked blocks.

In an embodiment, when the second 3D child node is within the surface of the object 30, the propagated distance is a negative value. When the second 3D child node is outside of the surface of the object 30, the propagated distance is a positive value.

In step S4, for each of the 3D parent nodes 310, a curvature thereof is generated. In an embodiment, step S4 can be performed together with step S3.

In an embodiment, the curvature of each of the 3D parent nodes 310 is generated according to normal vectors of the 3D child nodes 300 therein. In an embodiment, the normal vectors can be calculated based on the distances of the 3D child nodes 300.

In an embodiment, the curvature is smaller when the surface traversing through the 3D parent nodes 310 is flatter. The curvature is larger when the surface traversing through the 3D parent nodes 310 is not flat.

Figure 3D:
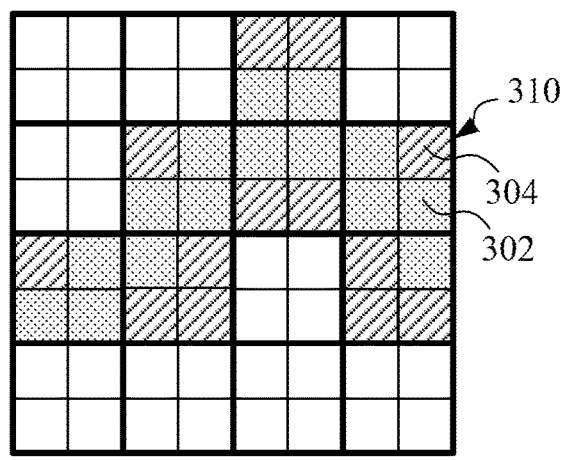

In the present embodiment, for the sixteen 3D parent nodes 310 illustrated in FIG. 3D, most of the 3D parent nodes 310 can be considered flat such that each the curvatures thereof is smaller than a predetermined value, except that the curvature of the 3D parent node 310 located at the first row and the third column and the curvature of the 3D parent node 310 located at the second row and the third column are not smaller than the predetermined value since the surfaces of the object 30 in FIG. 3A corresponding to these two nodes are not flat.

In step S5, whether the number of the 3D parent nodes is a predetermined number is determined.

In an embodiment, the predetermined number is one.

As a result, when the number of the 3D parent nodes is not one, the 3D parent nodes 310 are treated as the 3D child nodes in step S6 to further perform the steps S2-S4.

Figure 3E:
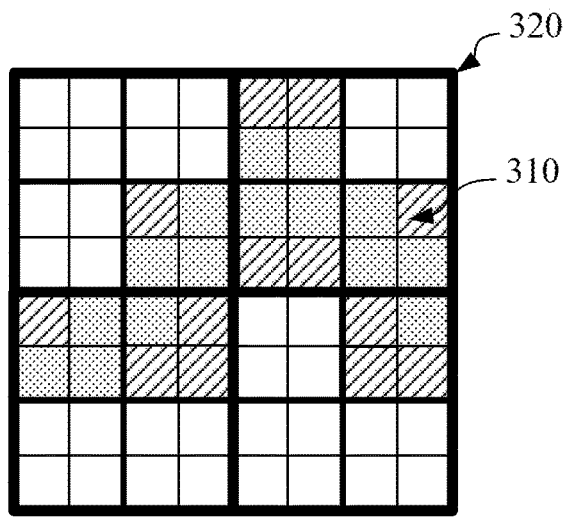

As a result, by performing step S2, the 3D parent nodes 310 now become child nodes and are grouped into a plurality of 3D parent nodes 320, as illustrated in FIG. 3E. In an embodiment, four 3D parent nodes 310 are grouped as one 3D parent node 320.

By performing step S3, for each of the 3D parent nodes 320, propagated distances of the 3D parent nodes 310 that do not have the distance are generated within the 3D parent nodes 320 according to the distances of the 3D parent nodes 310 that has the distance within the same 3D parent nodes 320. As a result, in FIG. 3F, after step S3 is performed, the 3D parent nodes 310 having the propagated distances are illustrated as blocks with slash lines.

By performing step S4, for each of the 3D parent nodes 320, a curvature thereof is generated according to the curvatures of the 3D parent nodes 310 within each of the 3D parent nodes 320.

Figure 3F:
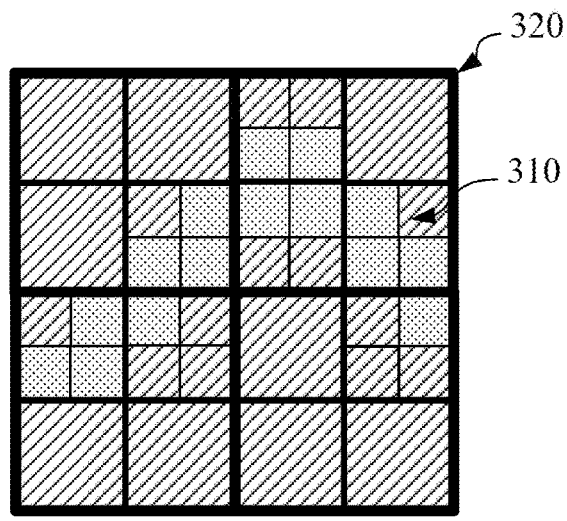

In the present embodiment, for the four 3D parent nodes 320 illustrated in FIG. 3F, most of the 3D parent nodes 320 can be considered flat such that each of the curvatures thereof is smaller than the predetermined value, except that the curvature of the 3D parent node 320 located at the first row and the second column is not smaller than the predetermined value since the curvatures of two of the 3D parent nodes 310 included therein are not flat.

By performing step S5, the number of the 3D parent nodes 320 is determined not to be the predetermined number, the 3D parent nodes 320 are treated as the 3D child nodes in step S6 to perform the steps S2-S4.

Figure 3G:
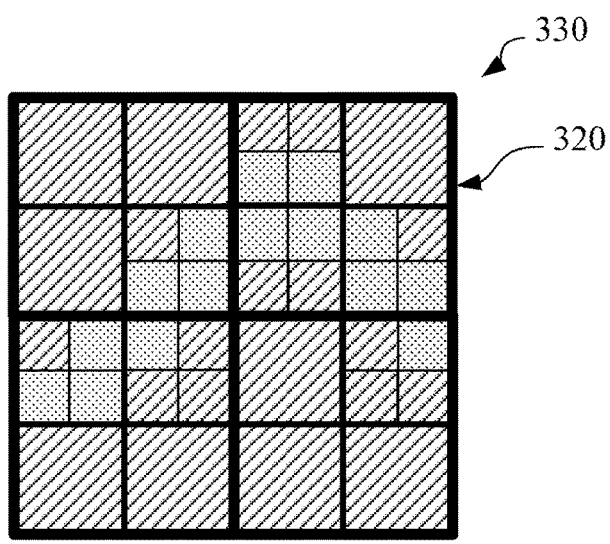

As a result, by performing step S2, the 3D parent nodes 320 now become child nodes and are grouped into a 3D parent node 330, as illustrated in FIG. 3G. In an embodiment, four 3D parent nodes 320 are grouped as one 3D parent node 330.

Subsequently, since there is no other parent node that does not have the distance, step S3 can be skipped. By performing step S4, for the 3D parent node 330, a curvature thereof is generated according to the curvatures of the 3D parent nodes 320 within the 3D parent node 330.

In the present embodiment, for the 3D parent nodes 330 illustrated in FIG. 3G, the curvature of thereof is not smaller than the predetermined value since the curvature of one of the 3D parent nodes 320 included therein is not flat.

By performing step S5, the number of the 3D parent node 330 is determined to be the predetermined number, which is one in the present embodiment. As a result, in step S7 the 3D parent node 330 becomes a root to generate a tree including a plurality levels of nodes.

In the present embodiment, the tree generated by using the flow described above has the root that is the 3D parent node 330 at a first level, which is a top level. The 3D parent node 330 includes four child nodes that are the 3D parent nodes 320 at a second level. Each of the 3D parent nodes 320 includes four child nodes that are the 3D parent nodes 310 at a third level. Each of the 3D parent nodes 310 includes eight child nodes that are the 3D child nodes 300 at a fourth level, which is a bottom level.

The structure of the tree described above is merely an example. In an embodiment, each of the nodes in the tree except the nodes at the bottom level includes 8 child nodes such that the tree is an octree. However, the present invention is not limited thereto. Further, the predetermined number used to determine whether the 3D parent nodes become a root or not can be a number larger than one. More specifically, the tree may include the root having more than one 3D parent nodes, depending on practical requirements.

In step S8, for each of the levels of the tree, the 3D child nodes of at least one of the 3D parent nodes are discarded when the curvature thereof is smaller than a predetermined value.

Figure 4:
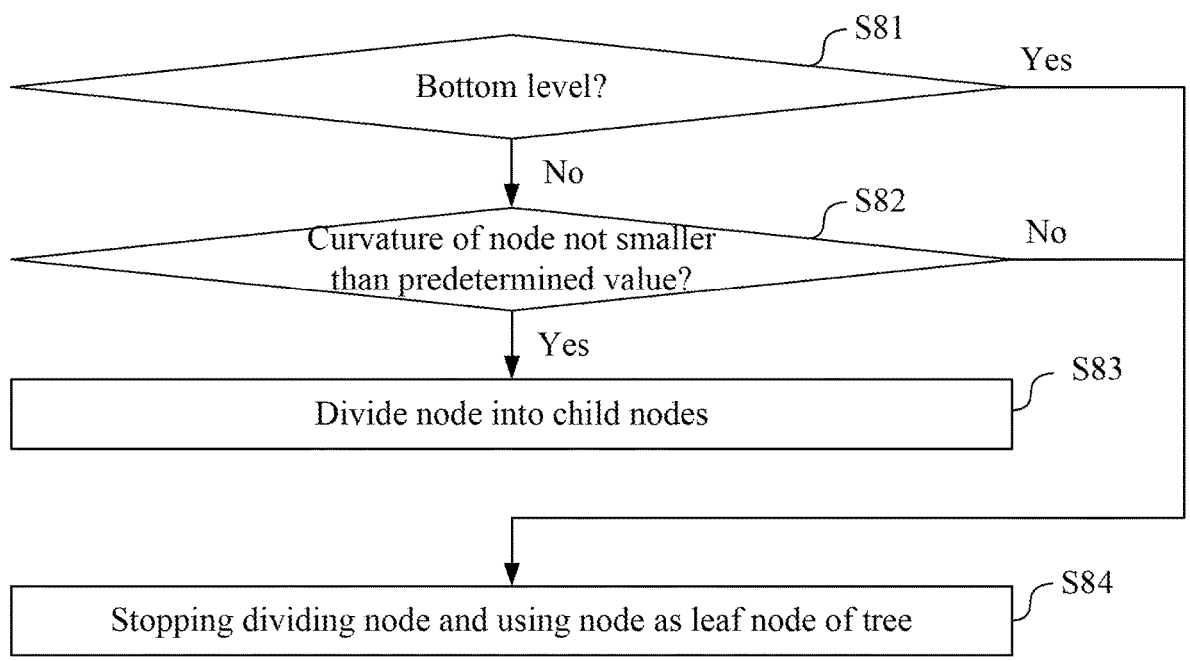
FIG. 4 is a flow chart of steps for performing step S8 in FIG. 2 in an embodiment of the present disclosure.
Figure 5A:
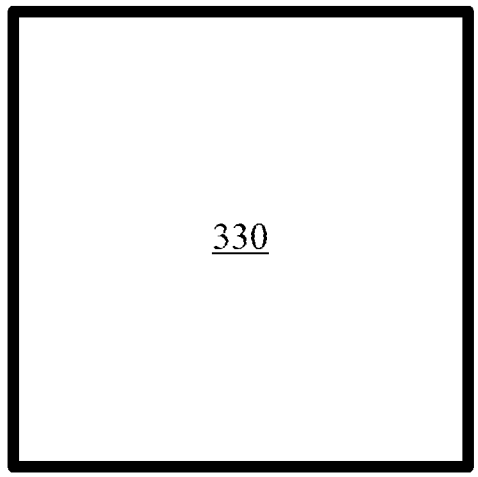
FIG. 5A to FIG. 5D are diagrams illustrating the child nodes discarding process performed on the tree in an embodiment of the present disclosure.
Figure 5B:
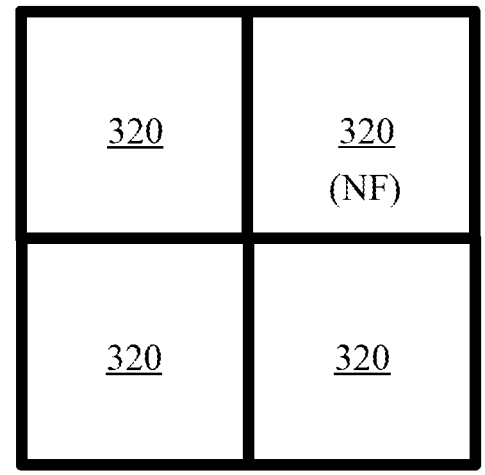
Figure 5C:
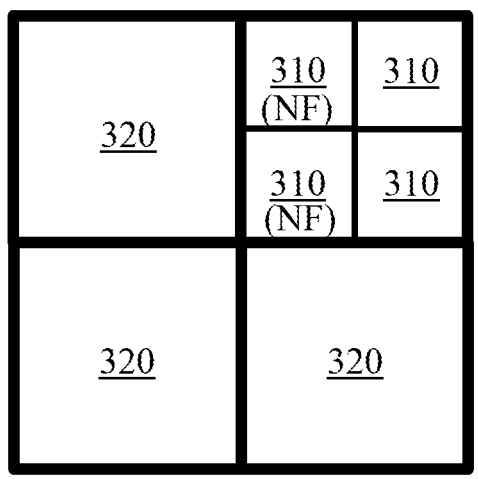

Reference is now made to FIG. 4 and FIG. 5A to FIG. 5D. FIG. 4 is a flow chart of steps for performing step S8 in FIG. 2 in an embodiment of the present disclosure. FIG. 5A to FIG. 5C are diagrams illustrating the child nodes discarding process performed on the tree in an embodiment of the present disclosure.

As illustrated in FIG. 5A, for the first level of the tree, only the root, i.e. the 3D parent node 330 exists.

In step S81, whether the level is a bottom level is determined.

Since the first level is not the bottom level of the tree, in step S82, whether the curvature of the 3D parent node 330 is smaller than the predetermined value is determined.

In an embodiment, as described above, the curvature of the 3D parent node 330 is not smaller than the predetermined value.

As a result, in step S83, the 3D parent node 330 is divided into the 3D child nodes at the next lower level, i.e. the four 3D parent nodes 320 at the second level, as illustrated in FIG. 5B.

The flow goes back to step S81 again, in which whether the level is the bottom level is determined. Since the level under processing now is the second level instead of the bottom level, step 82 is performed to determine whether the curvatures of the 3D parent nodes 320 are smaller than the predetermined value.

In an embodiment, as described above, in the four 3D parent nodes 320, only the curvature of the 3D parent node 320 located at the first row and the second column (labeled as "NF" in FIG. 5B) is not smaller than the predetermined value, while the curvature of each of the other three 3D parent nodes 320 is smaller than the predetermined value.

As a result, for the three 3D parent nodes 320 having the curvature smaller than the predetermined value, step S84 is performed to stop dividing the three 3D parent nodes 320 and use the three 3D parent nodes 320 as leaf nodes of the tree.

For the 3D parent node 320 having the curvature not smaller than the predetermined value, step S83 is performed to divide the 3D parent node 320 into the 3D child nodes at the next lower level, i.e. the four 3D parent nodes 310 at the third level, as illustrated in FIG. 5C.

The flow goes back to step S81 again, in which whether the level is the bottom level is determined. Since the level under processing now is the third level instead of the bottom level, step 82 is performed to determine whether the curvatures of the 3D parent nodes 310 are smaller than the predetermined value In an embodiment, as described above, in the four 3D parent nodes 310, the curvatures of two of the 3D parent nodes 310 (labeled as "NF" in FIG. 5C) are not smaller than the predetermined value, while the curvature of each of the other two 3D parent nodes 320 is smaller than the predetermined value.

As a result, for the 3D parent nodes 310 having the curvature smaller than the predetermined value, step S84 is performed to stop dividing the two 3D parent nodes 310 and use the two 3D parent nodes 310 as leaf nodes of the tree.

Figure 5D:
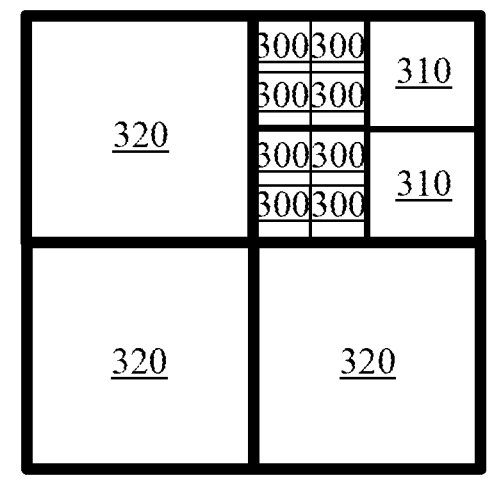

For the 3D parent nodes 310 having the curvature not smaller than the predetermined value, step S83 is performed to divide each of the 3D parent node 310 into the 3D child nodes at the next lower level, i.e. the eight 3D child nodes 300 at the fourth level, as illustrated in FIG. 5D.

The flow goes back to step S81 again, in which whether the level is the bottom level is determined. Since the level under processing now is the fourth level, which is the bottom level, step 84 is performed to stop dividing the 3D child nodes 300 and use the 3D child nodes 300 as leaf nodes of the tree.

As a result, after the processing of the flow illustrated in FIG. 4, the 3D child nodes of the 3D parent nodes having the curvature smaller than the predetermined value at each of the levels of the tree are discarded.

Subsequently, as illustrated in FIG. 2, in step S9, a surface extracting processing is performed on the tree according to a dual marching cube algorithm to extract at least one surface of the scene.

Figure 6A:
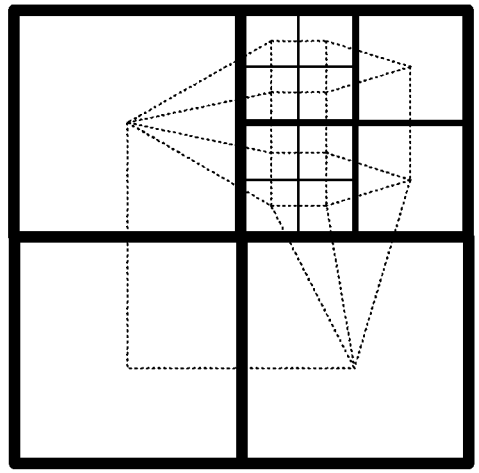
FIG. 6A to FIG. 6C. are diagrams illustrating the process of dual marching cube algorithm in an embodiment of the present invention.
Figure 6B:
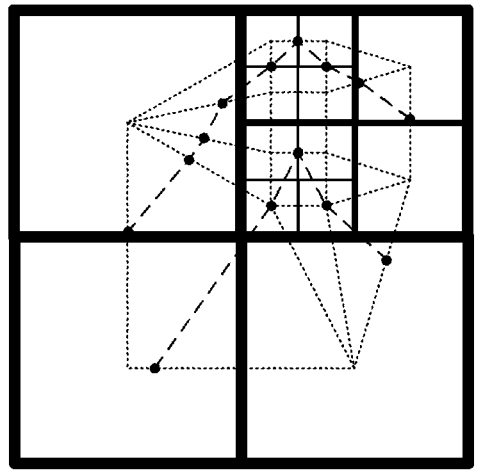
Figure 6C:
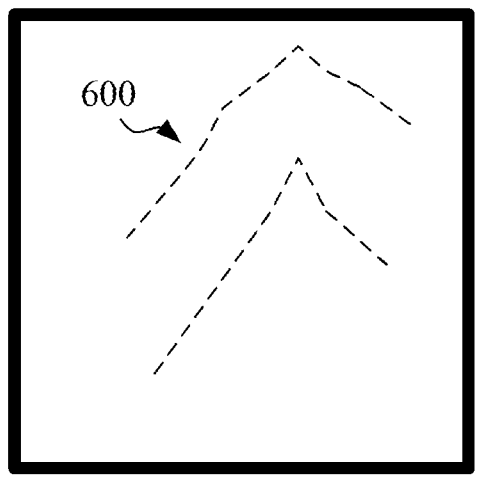

Reference is now made to FIG. 6A to FIG. 6C. FIG. 6A to FIG. 6C are diagrams illustrating the process of dual marching cube algorithm in an embodiment of the present invention.

In an embodiment, as illustrated in FIG. 6A, the node centers of the leaf nodes of the trees, i.e. the three 3D parent nodes 320, the two 3D parent nodes 310 and the four 3D child nodes 300 illustrated in FIG. 5D, are connected to form a plurality of cells illustrated as blocks with dotted line edges. Subsequently, the marching cubes algorithm is applied on the cells in FIG. 6B to extract the surface 600 in FIG. 6C.

As a result, the surface extraction apparatus 100 and the surface extraction method 200 of the present invention can propagate depth data to build the tree when the depth data is not continuous to save the memory usage such that the dual marching cube algorithm can be used to accomplish a smooth surface extraction result.

It should be noted that, in some embodiments, the surface extraction method 200 may be implemented as a computer program. When the computer program is executed by a computer, an electronic device, or the processing circuit 110 in FIG. 1, this executing device performs the surface extraction method 200. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the steps of the abovementioned surface extraction method 200, no particular sequence is required unless otherwise specified. Moreover, the steps may also be performed simultaneously or the execution times thereof may at least partially overlap.

Furthermore, the steps of the surface extraction method 200 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the step of the circuitry in accordance with the functions and steps described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A surface extraction method, comprising:
   (A) receiving raw input depth data of a plurality of 3D child nodes of a scene, wherein the raw input depth data comprises positions and distances of a plurality of first 3D child nodes of the 3D child nodes and the positions but without the distances of a plurality of second 3D child nodes of the 3D child nodes, and
   each of the distances is a distance value from the first 3D child nodes to an object surface of an object in the scene;
   (B) grouping the neighboring 3D child nodes into a plurality of 3D parent nodes, wherein each of the 3D parent nodes comprises the same number of the 3D child points;
   (C) for each of the 3D parent nodes, generating propagated distances of the second 3D child nodes within the 3D parent nodes according to the distances of the first 3D child nodes within the same 3D parent nodes, wherein the step (C) further comprises:
   generating a curvature of each of the 3D parent nodes according to normal vectors of the 3D child nodes therein, wherein the normal vectors of the 3D child nodes are calculated based on the distances of the 3D child nodes;
   (D) treating the 3D parent nodes as the 3D child nodes to perform the steps (B)-(D) until the number of the 3D parent nodes is a predetermined number that become a root to generate a tree comprising a plurality of levels of nodes;
   for each of the levels of the tree, determining whether the level is a bottom level and whether the curvature of the nodes thereof is smaller than a predetermined value;
   for the level that is not the bottom level and for at least one of the nodes that has the curvature not smaller than the predetermined value, dividing each of the nodes into the 3D child nodes at a next lower level,
   for the level that is the bottom level or for at least one of the nodes that has the curvature smaller than the predetermined value, stopping dividing the nodes and using the nodes as leaf nodes of the tree; and
   performing a surface extracting processing on the tree according to a dual marching cube algorithm to extract at least one surface of the scene.

2. The surface extraction method of claim 1, wherein the step of performing the surface extracting processing further comprises:
   connecting node centers of the leaf nodes to form a plurality of cells; and
   applying marching cubes algorithm on the cells to extract the surface.

3. The surface extraction method of claim 1, wherein each of the propagated distances of the second 3D child nodes within the surface of the object in the scene is a negative value, and the each of the propagated distances of the second 3D child nodes outside of the surface of the object in the scene is a positive value.

4. The surface extraction method of claim 1, wherein for each of the levels of the tree, each of the 3D parent nodes comprises 8 of the 3D child points that form a cube and the tree is an octree.

5. A surface extraction apparatus, comprising:
   a processing circuit; and
   a memory electrically connected to the processing circuit and configured to store at least one program configured to be executed by the processing circuit, the at least one program comprising instructions for performing a surface extraction method comprising:
   (A) receiving raw input depth data of a plurality of 3D child nodes of a scene from a depth camera, wherein the raw input depth data comprises positions and distances of a plurality of first 3D child nodes of the 3D child nodes and the positions but without the distances of a plurality of second 3D child nodes of the 3D child nodes, and each of the distances is a distance value from the first 3D child nodes to an object surface of an object in the scene;
   (B) grouping the neighboring 3D child nodes into a plurality of 3D parent nodes, wherein each of the 3D parent nodes comprises the same number of the 3D child points;
   (C) for each of the 3D parent nodes, generating propagated distances of the second 3D child nodes within the 3D parent nodes according to the distances of the first 3D child nodes within the same 3D parent nodes, wherein the step (C) further comprises:
   generating a curvature of each of the 3D parent nodes according to normal vectors of the 3D child nodes therein, wherein the normal vectors of the 3D child nodes are calculated based on the distances of the 3D child nodes;

(D) treating the 3D parent nodes as the 3D child nodes to perform the steps (B)-(D) until the number of the 3D parent nodes is a predetermined number that become a root to generate a tree comprising a plurality of levels of nodes;

for each of the levels of the tree, determining whether the level is a bottom level and whether the curvature of the nodes thereof is smaller than a predetermined value;

for the level that is not the bottom level and for at least one of the nodes that has the curvature not smaller than the predetermined value, dividing each of the nodes into the 3D child nodes at a next lower level;

for the level that is the bottom level or for at least one of the nodes that has the curvature smaller than the predetermined value, stopping dividing the nodes and using the nodes as leaf nodes of the tree; and performing a surface extracting processing on the tree according to a dual marching cube algorithm to extract at least one surface of the scene.

6. The surface extraction apparatus of claim 5, wherein the step of performing the surface extracting processing further comprises:

connecting node centers of the leaf nodes to form a plurality of cells; and applying marching cubes algorithm on the cells to extract the surface.

7. The surface extraction apparatus of claim 5, wherein each of the propagated distances of the second 3D child nodes within the surface of the object in the scene is a negative value, and the each of the propagated distances of the second 3D child nodes outside of the surface of the object in the scene is a positive value.

8. The surface extraction apparatus of claim 5, wherein for each of the levels of the tree, each of the 3D parent nodes comprises 8 of the 3D child points that form a cube and the tree is an octree.

9. A non-transitory computer readable storage medium storing at least one program, comprising instructions, which when executed, causes a processing circuit to perform a surface extraction method comprising:

(A) receiving raw input depth data of a plurality of 3D child nodes of a scene from a depth camera, wherein the raw input depth data comprises positions and distances of a plurality of first 3D child nodes of the 3D child nodes and the positions but without the distances of a plurality of second 3D child nodes of the 3D child nodes, and each of the distances is a distance value from the first 3D child nodes to an object surface of an object in the scene;

(B) grouping the neighboring 3D child nodes into a plurality of 3D parent nodes, wherein each of the 3D parent nodes comprises the same number of the 3D child points;

(C) for each of the 3D parent nodes, generating propagated distances of the second 3D child nodes within the 3D parent nodes according to the distances of the first 3D child nodes within the same 3D parent nodes, wherein the step (C) further comprises:

generating a curvature of each of the 3D parent nodes according to normal vectors of the 3D child nodes therein, wherein the normal vectors of the 3D child nodes are calculated based on the distances of the 3D child nodes;

(D) treating the 3D parent nodes as the 3D child nodes to perform the steps (B)-(D) until the number of the 3D parent nodes is a predetermined number that become a root to generate a tree comprising a plurality of levels of nodes;

for each of the levels of the tree, determining whether the level is a bottom level and whether the curvature of the nodes thereof is smaller than a predetermined value;

for the level that is not the bottom level and for at least one of the nodes that has the curvature not smaller than the predetermined value, dividing each of the nodes into the 3D child nodes at a next lower level;

for the level that is the bottom level or for at least one of the nodes that has the curvature smaller than the predetermined value, stopping dividing the nodes and using the nodes as leaf nodes of the tree; and performing a surface extracting processing on the tree according to a dual marching cube algorithm to extract at least one surface of the scene.

10. The non-transitory computer readable storage medium of claim 9, wherein the step of performing the surface extracting processing further comprises:

connecting node centers of the leaf nodes to form a plurality of cells; and applying marching cubes algorithm on the cells to extract the surface.

11. The non-transitory computer readable storage medium of claim 9, wherein each of the propagated distances of the second 3D child nodes within the surface of the object in the scene is a negative value, and the each of the propagated distances of the second 3D child nodes outside of the surface of the object in the scene is a positive value.

* * * * *